United States Patent [19]
Ohkawara et al.

[11] Patent Number: 6,084,833
[45] Date of Patent: *Jul. 4, 2000

[54] SYSTEM FOR STORING A PLURALITY OF RECORDED MEDIUMS IN A REPRODUCING SYSTEM

[75] Inventors: Masamitsu Ohkawara; Touru Suzuki; Atsushi Iitsuka; Shigeru Umebara, all of Saitama-ken, Japan

[73] Assignee: Pioneer Electronic Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/799,208

[22] Filed: Feb. 13, 1997

[30] Foreign Application Priority Data

Feb. 15, 1996 [JP] Japan ................................. 8-028310

[51] Int. Cl.$^7$ ................................................ G11B 17/22
[52] U.S. Cl. .................................................... 369/37
[58] Field of Search ................................. 369/36, 37, 38, 369/75.1, 75.2

[56] References Cited

U.S. PATENT DOCUMENTS 4,750,160  6/1988  Miller et al. ........................... 369/37
4,791,626  12/1988  Staar ....................................... 369/37
5,020,043  5/1991  Kohler ..................................... 369/36

FOREIGN PATENT DOCUMENTS

0506458A2  9/1992  European Pat. Off. .

Primary Examiner—Stuart S. Levy
Assistant Examiner—Tod Kupstas
Attorney, Agent, or Firm—Arent Fox Kintner Plotkin & Kahn, PLLC

[57] ABSTRACT

A plurality of rotary circular racks are vertically disposed. Each of the racks has a plurality of radial slits, for storing recording mediums, and a radially formed recess without the slits. The recesses of all racks are located at the same circumferential position. A disc player is provided to be vertically moved passing through the recess for reproducing a disc removed from one of the slits. An encoder comprising a plurality of slits are circumferentially provided on each of the racks, and a sensor is provided for detecting an angular position of each of the slits, whereby an angular position of all of the racks is determined in order to reproduce a selected disc stored in one of the racks.

5 Claims, 15 Drawing Sheets

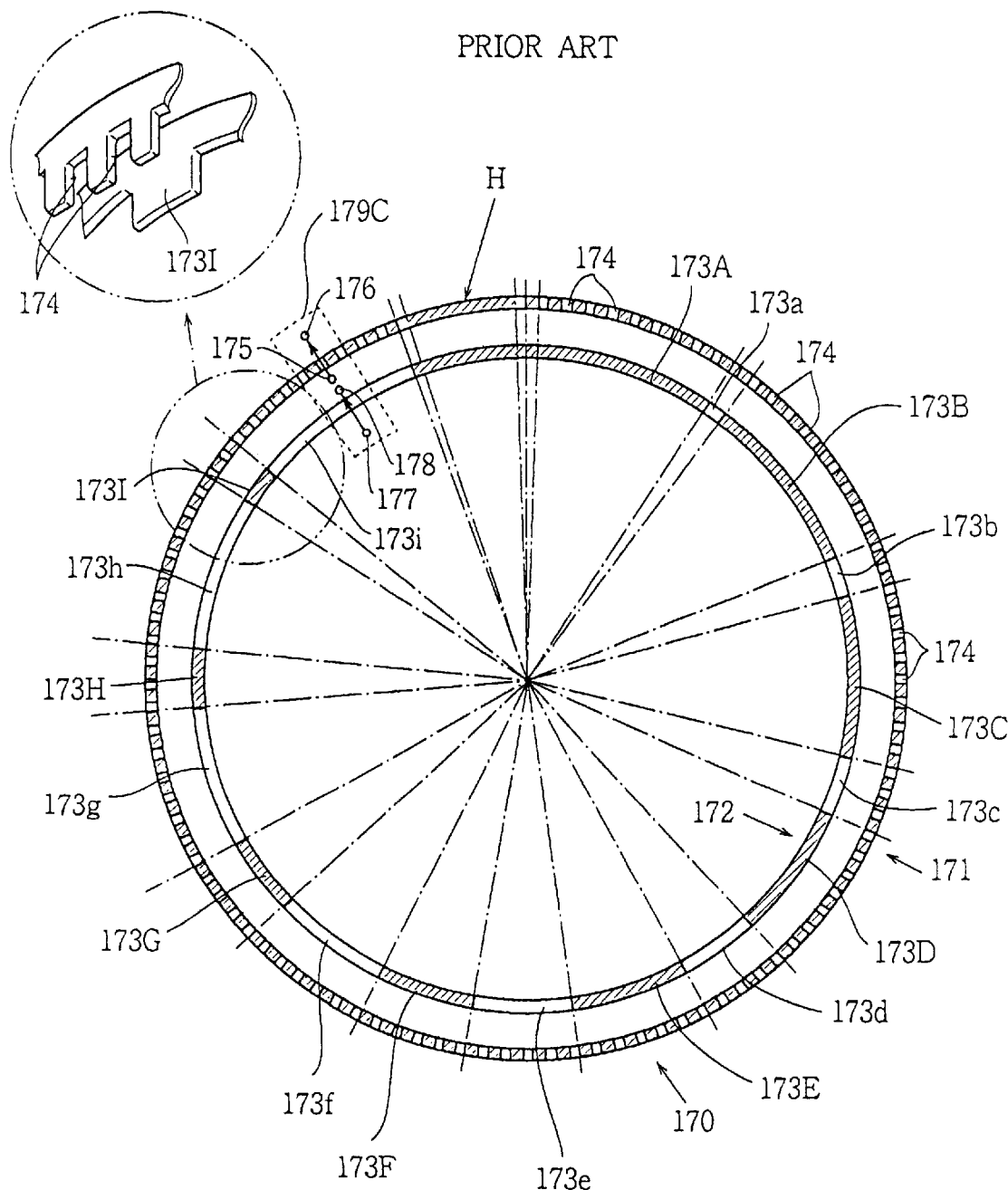

SYSTEM FOR STORING A PLURALITY OF RECORDED MEDIUMS IN A REPRODUCING SYSTEM

BACKGROUND OF THE INVENTION

The present invention relates to a system for storing a plurality of recording mediums in a reproducing system, and more particularly to a storing system having a plurality of rotary circular racks wherein a plurality of discs such as CDs are stored.

A disc reproducing system having an automatic disc changer has recently become popular. The disc reproducing system is provided with a rack wherein a large number of CDs are stored so as to improve the storing efficiency of the CDs.

Referring to FIG. 15 showing one of these conventional reproducing systems, having a rotary circular rack 40, a disc reproducing system 10 has a chassis 20 on which a roulette device 30 is mounted. The roulette device 30 comprises a base 31 on which a circular rack base 32 having a spindle 33 is mounted. The circular rack 40 having a plurality of radial slits 45 is rotatably mounted on the spindle 33. A twelve-centimeter CD 200 or an eight-centimeter CD (not shown) is held in each slit 45. A disc player 70 having an arm 72 for loading the CD 200 into the player 70 is further mounted on the base 31.

The roulette device 30 and the disc player 70 are covered by a casing 90, rear panel 100, and a front operation panel 110 which are securely mounted on the chassis 20. The operation panel 110 has an opening 111 through which CDs can be exchanged. The opening 111 is covered by an arcuated door 60 having a sector shaped top. The door 60 is rotatably mounted on a center post 50, which is mounted on the spindle 33 of the rack base 32, at the angle of the sector-shaped top.

Referring to FIG. 16, the rack 40 has an encoder 170 on the underside thereof. The encoder 170 comprises an outer ring 171 and an inner ring 172. The outer ring 171 has a plurality of slits 174 equiangularly formed in the entire circumference of the ring except for an area called a home position H corresponding to an area where slits 45 are not formed on the upper side of the rack. Each slit 174 corresponds to one of the slits 45. The inner ring 172 has nine light blocking projections 173A to 173I and nine slits 173a to 173i formed between the blocking projections. The widths of the slits 173a to 173i increase gradually starting from the home position H in the clockwise direction as shown in FIG. 16.

An optical sensor 179C comprising a first set of light emitting element 175 and light receiving element 176 and a second set of light emitting element 177 and light receiving element 178 are mounted on the base 31 adjacent the encoder 170. As the rack 40 is rotated, the light from the light emitting element 175 is applied to the light receiving element 176, thereby generating pulses, each pulse corresponding to the slit 174 of the outer ring 171. The light from the light emitting element 177 is applied to the light receiving element 178 thereby generating pulses, each pulse width corresponding to each of the slits 173a to 173i of the inner ring 172. The angular position of the rack 40 can thus be determined by detecting the combination of the pulses.

Since the slits 174 are not formed in the home position H, when the sensor 179C faces the home position, pulses are not generated.

The disc reproducing system 10 is operated by operating various buttons (not shown) formed on the operating panel 110. When a select button is depressed to select one of the CDs 200 to be played, the rack 40 is rotated. The angular position of the rack 40 is detected by the encoder 170 and the optical sensor 179C so that the rotation of the rack 40 is stopped when the slit 45 storing the selected CD 200 is at the loading position directly opposite the disc player 70. Thereafter, the arm 72 projecting out from the disc player 70 is inserted into the slit 45 from the underside of the rack 40 and engages the CD 200. The arm 72 is further rotated to carry the CD 200 in the slit 45 into the player 70.

In such a disc reproducing system, the CDs are radially stored in the circular rack 40 so that the storing efficiency is improved.

Although the slits 174 are not formed in the home position H, it is possible to detect the slit 45 at the loading position if the optical sensor 179C is disposed adjacent the disc player 70, thereby directly detecting the slit 45 opposite the disc player 70, that is at the loading position.

However, the angular position of the rack 40 must also be detected when exchanging the CDs in the rack with other CDs. Namely, it is necessary to detect the slits 45 which face the opening 111 of the operation panel 110. If the rack 40 is at a position where the optical sensor 179C is within the home position, it is impossible to detect the slits 45 confronting the opening 111.

In order to further improve the storing efficiency of the CDs, it is desirable that the conventional disc reproducing system 10 of FIG. 15 is modified so that a plurality of racks 40 are vertically tiered. For the sake of restraining the manufacturing cost, it is preferable that only one disc player 70 is provided, and the player is arranged to vertically move for playing a CD stored in any of the racks 40. In order to allow the disc player 70 to freely move without interference from the racks 40, the disc player 70 is firstly withdrawn away from the racks 40. The disc player 70 is then vertically moved to the height of a particular rack 40 storing the selected CD. After the rack 40 is rotated to a position where the slit 45 of the selected CD faces the disc player 70, the disc player 70 is advanced so as to carry the CD from the rack 40 into the player 70.

However, such a system requires additional operations such as retreat, vertical movement and the advance of the disc player 70 so that, not only does the operating mechanism become complicated, there must be provided an additional space for moving the disc player 70. Hence, such a modification is disadvantageous from the point of reducing the manufacturing cost and decreasing the size of the system.

In order to solve the problem, it is necessary to provide a recess having a sufficient dimension in each of the racks 40, so that the disc player 70 may vertically pass through without the arm 72 or any other parts of the player getting caught by the rack 40. Thus the disc player 70 no longer needs to move in the horizontal plane and the mechanism for moving the disc player 70 is much simplified, thereby enabling to reduce the manufacturing cost and to decrease size of the system.

When such a recess is formed in the rack 40, the area where the CDs cannot be stored is increased. As a result, the area of the home position of the encoder 170 is also increased. The slit 45 at the loading position can still be determined as described above when the optical sensor 179C is disposed to confront the disc player 70. However, slits 45 facing the opening 111 of the operation panel 110 cannot be determined when the sensor 179c happens to be at the home position.

Another problem which arises concerns a locking device of the rack 40. The rack 40 must be locked so as not to rotate while the CD is carried toward the disc player 70. The locking means, for example, comprises a lock pin provided on the disc player 70 so as to be projected, and a plurality of receptacles formed on the periphery of the rack 40 to which the lock pin engages. When the angular position of the rack is determined so that a particular slit 45 opposes the disc player 70, the pin of the disc player 70 engages with the receptacle adjacent the slit, thereby preventing the rotation of the rack. However, receptacles cannot be formed in the area where the recess for allowing the vertical movement of the disc player is cut out. Accordingly, the rack 40 cannot be locked when disposed in certain positions.

SUMMARY OF THE INVENTION

An object of the present invention is to provide a reproducing system having a plurality of rotatable racks, each storing a large number of media, wherein the angular position of each rack can be accurately determined and the rack can be securely locked upon loading of a medium into a reproducing device.

According to the present invention, there is provided a system for storing a plurality of recording mediums in a reproducing system comprising, a plurality of rotary circular racks vertically disposed, each of the racks having a plurality of radial slits, each for storing a recording medium, and having a radially formed recess without the slits, the recesses of all racks being located at the same circumferential position, a disc player provided to be vertically moved passing through the recess for reproducing a disc removed from one of the slits, a rotating device for rotating the circular racks at the same time, detected portions circumferentially provided on each of the racks, detector means for detecting an angular position of each of the detected portions.

Thus, an angular position of all of the racks is determined in order to reproduce a selected disc stored in one of the racks.

The detected portions may be equiangularly disposed slits, and are also formed in an area of the recess.

The disc player has a disc loading device which is provided to be moved in the radial direction for loading a disc on the player, and a lock means is mounted on the disc player for locking the racks during the loading of a disc.

These and other objects and features of the present invention will become more apparent from the following detailed description with reference to the accompanying drawings.

BRIEF DESCRIPTION OF DRAWINGS

FIG. 16 is a sectional view of an encoder provided on the underside of a rack of the disc reproducing system of FIG. 15.

DETAILED DESCRIPTION OF THE PREFERRED EMBODIMENTS

The disc reproducing system according to the present invention is described hereinafter with reference to the accompanying drawings. The same numerals in FIGS. 15 and 16 designate the same parts in FIGS. 1 to 14.

Figure 1:
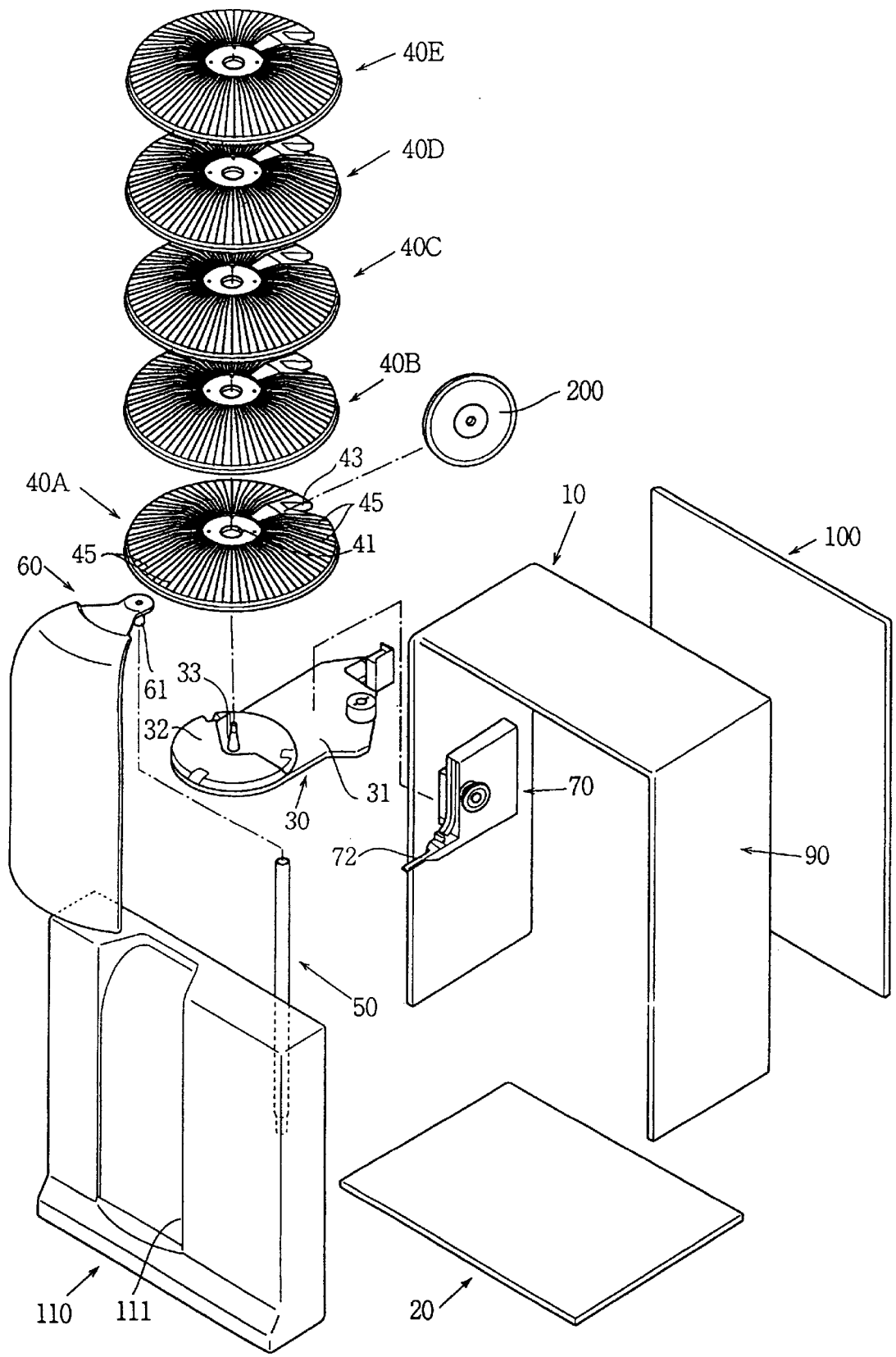
FIG. 1 is an exploded perspective view of a disc reproducing system according to the present invention.

Referring to FIG. 1, a disc reproducing system 10 of the present invention is provided with the roulette device 30 mounted in a housing comprising the chassis 20, casing 90, rear panel 100 and the front operation panel 110. The roulette device 30 comprises the base 31, rack base 32 having the spindle 33 and the center pole 50 mounted on the spindle 33, and five rotary circular racks 40A, 40B, 40C, 40D and 40E, each having a center hole 41 in which the center pole 50 is engaged. Hence, all of the racks 40A to 40E are securely mounted on the center pole 50 in a tiered formation.

Figure 7:
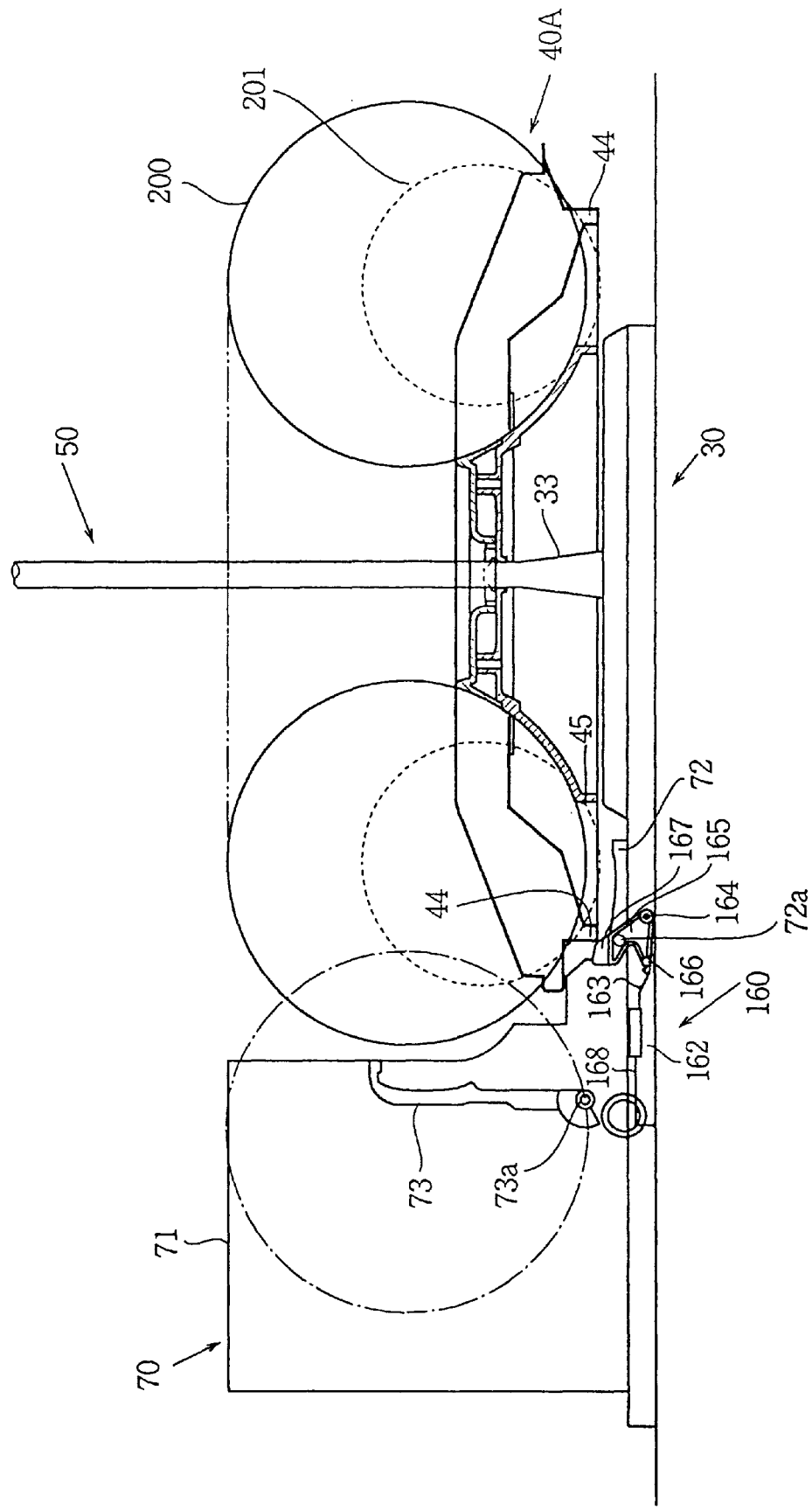
FIG. 7 is an elevational view of the rack and the disc player showing a loading device of the disc player.

In each of the racks 40A to 40E, there is formed the radial slits 45 wherein the twelve-centimeter CDs 200 and eight-centimeter CDs 201 shown in FIG. 7 can be stored. A radial recess 43 through which the disc player 70 provided adjacent the racks 40A to 40E passes is further formed in each of the racks 40A to 40E at a predetermined circumferential position. In the portion of each rack where the recess 43 is formed, the slits 45 cannot be formed. The recess 43 has sufficient area so that the arm 72 of the disc player 70 is not caught therein when passing through. The arm 72 is operated by a driving device (not shown) upon loading and ejecting of the CD into and out of the disc player 70 thereby passing through one of the slits 45 of the rack from the underneath thereof.

The front operation panel 110 is provided with the opening 111 through which the CDs 200 and 201 are inserted and taken out. The opening 111 is covered by the door 60 having a pin 61 projected downward from the top. The pin 61 engages with the upper end of the center pole 50 so that the door 60 is rotatably mounted thereon. The door 60 is rotated on the pole 50 in the counterclockwise direction to disclose the racks 40A to 40E through the opening 111, the operation of which will be later described.

Figure 2:
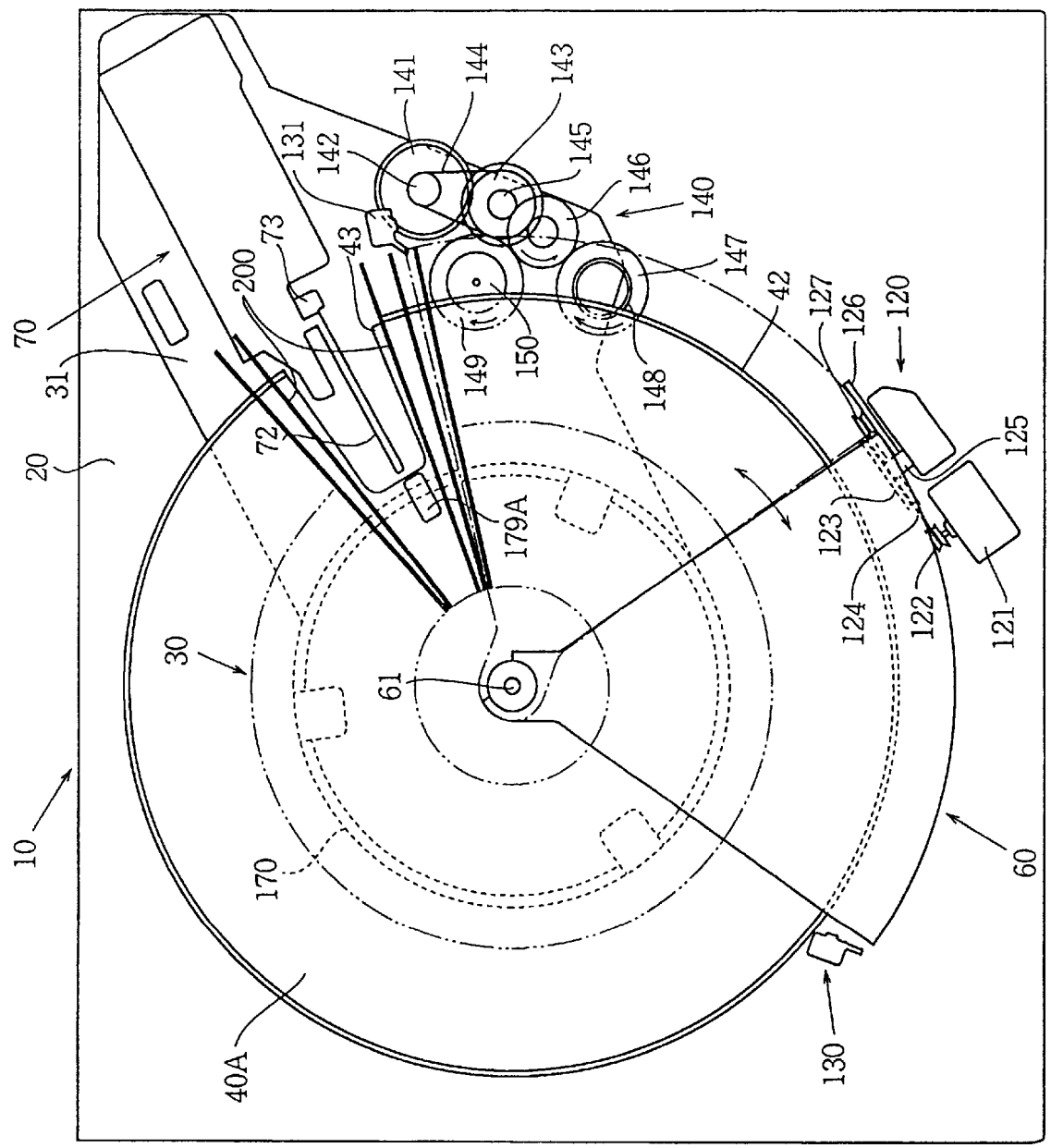
FIG. 2 is a plan view of the disc reproducing system of FIG. 1 showing a rack and a disc player provided therein.

Referring to FIG. 2, the disc reproducing system 10 is provided with a rack driving system 140 for rotating the racks 40A to 40E, disposed between the door 60 of the operation panel 110 and the disc player 70 and mounted on the base 31 of the roulette device 30. The rack driving system comprises a motor 141, a motor pulley 142 securely mounted on a spindle of the motor 141, gear pulley 143 operatively connected to the motor pulley 142 through a belt 144. The gear pulley 143 has a pinion 145 coaxial with the pulley 143 and which in turn engages with an intermediate gear 146. The intermediate gear 146 engages with the twin gears 147 and 149 having coaxial transmission gears 148 and 150, respectively. Both transmission gears 148 and 150 engage with teeth 42 formed on the outer periphery of the lowermost rack 40A.

When the motor 141 is driven, the power is transmitted to the transmission gears 148 and 150 through the motor pulley 142, belt 144, gear pulley 143, pinion 145, intermediate gear 156 and twin gears 147 and 149. The twin gears 147 and 149 rotates the rack 40A in the clockwise or counterclockwise direction due to the engagement with the teeth 42. The rotation of the lowermost rack 40A causes the center pole 50 to rotate, thereby rotating the other racks 40B to 40E simultaneously with the rack 40A.

Two sets of twin gears 147 and 149 and the transmission gears 148 and 150 are provided to cope with the situation where the rack 40A is so positioned that one of the transmission gears 148 and 150 faces the recess 43. Although one of the transmission gears 148 and 150 may be disengaged from the teeth 42, the other engages therewith. Hence the power of the motor 141 is always transmitted to rotate the racks 40A to 40E.

Although in the presently described embodiment, only one driving system 140 is provided to rotate all of the racks, a separate driving system may be provided for each rack.

The disc reproducing system is further provided with a door driving system 120 adjacent the door 60. The driving system 120 comprises a motor 121, a drive pulley 122 attached to a spindle of the motor 122, and gear pulley 123 operatively connected to the drive pulley 122 through a belt 124. The gear pulley 123 is mounted on a gear 125 which engages with a gear 126 of a double gear device. The other gear 127 of the double gear device engages a rack (not shown) provided on the bottom edge of the door 60.

When opening the door 60, the motor 121 is driven thereby to rotate the gear 127 through the motor pulley 122, belt 124, gear pulley 12 and gears 125 and 126. As a result, the door 60 is rotated in the counterclockwise direction about 65 degrees. An opening detecting switch 131 is provided adjacent the periphery of the rack 40A where the side edge of the door 60 reaches when opened. The door 60 accordingly closes the switch 131 so that the complete opening of the door 60 is detected.

When opened, the door 60 is disposed between the opening 111 and the rack driving system 140. Hence the operator is prevented from accidentally touching the driving system 140 with his hands. Thus the operator is protected from injury.

A closing detecting switch 130 is provided adjacent the periphery of the rack 40A where the other side edge of the door 60 reaches when the door is completely closed. Hence the closing of the door 60 can be detected.

The door 60, when opened, does not project out of the disc reproducing system. Therefore, the CDs can be easily put in and taken out of the racks 40A to 40E without colliding against the door. Moreover, although in a conventional system where the door is drawn upward, rendering it necessary to keep an open space above the system, in the system with the horizontally rotatable door 60, other systems can be mounted on top of the disc reproducing system 10.

The present embodiment may be modified so that the door 60 is rotatable in the clockwise direction. Since the space needed for rotating the door 60 can be formed along the outer periphery of the racks 40A to 40E, it has no effect in the arrangement of other parts provided in the disc reproducing system 10. Furthermore, the door may be a slidable door which slides in parallel to the front surface of the operation panel 110.

Figure 3:
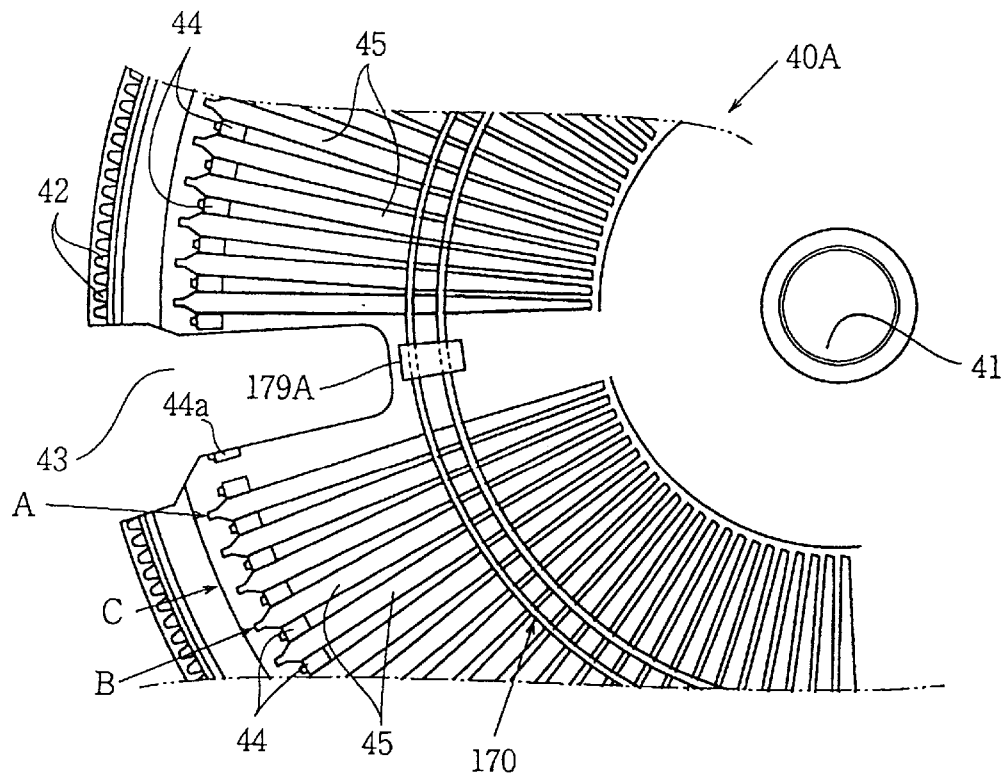
FIG. 3 is a fragmentary plan view of the rack as seen from the underside thereof.
Figure 4:
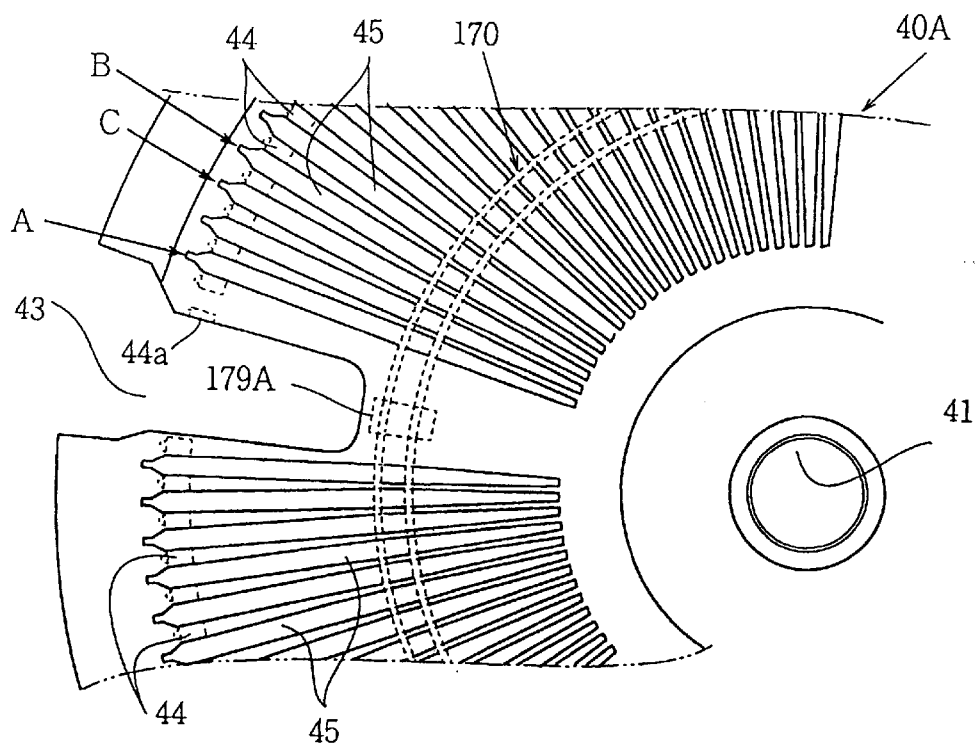
FIG. 4 is a fragmentary plan view of the rack as seen from the top.

FIGS. 3 and 4 show the rack 40A in detail.

Figure 5:
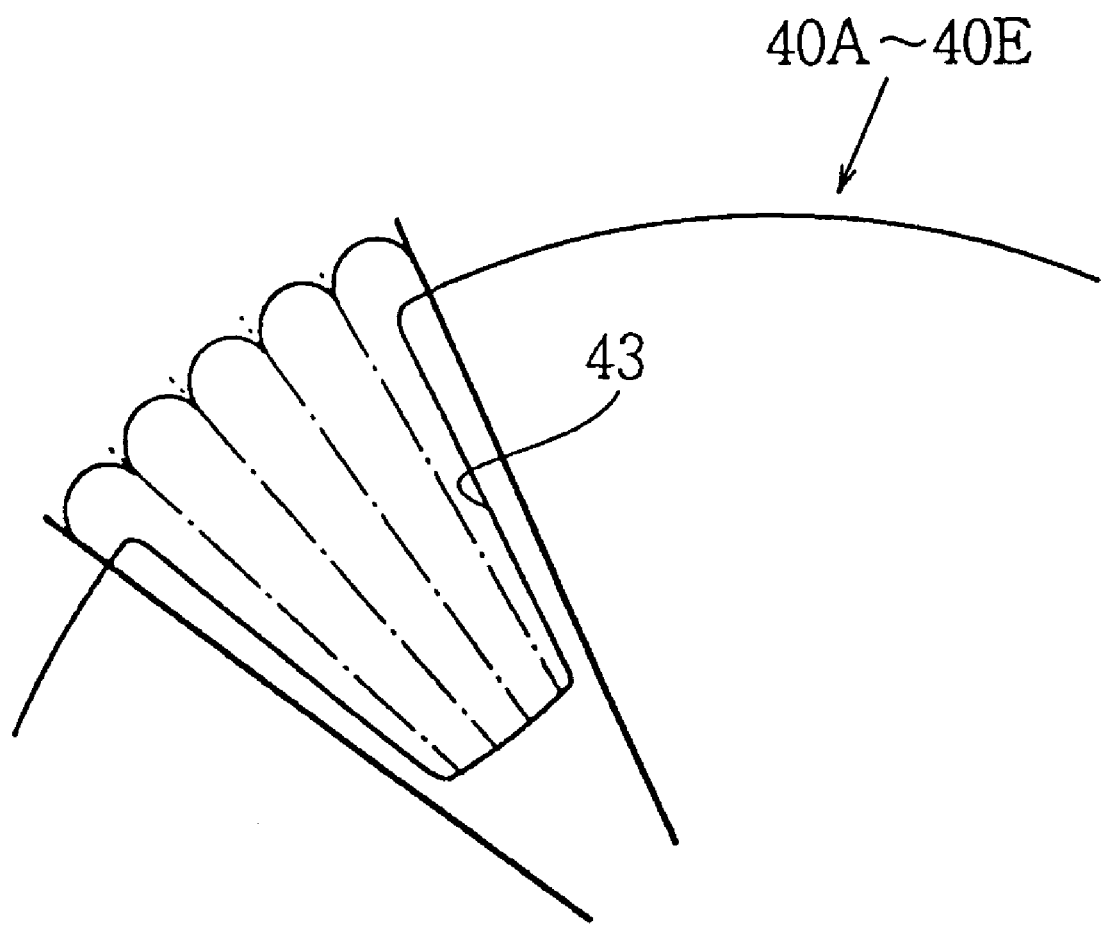
FIG. 5 is an illustration showing a recess formed in the rack.

Referring to FIGS. 3 and 4, the slits 45 for storing the CDs are radially formed on the rack 40A except for the portion of the recess 43. As shown in FIG. 5, the width of the recess 43 corresponds to a multiple of an integer of the distance between two adjacent slits 45. A projecting lock chip 44 is provided in each space formed between the slits 45 and an auxiliary projecting lock chip 44a is provided on one of the side edges of the recess 43. The lock chips 44 and 44a are for locking the rotation of the rack 40A when loading the CD 200 or 201 into the disc player 70.

More particularly, when taking out a CD in the slit 45 marked B in the figures, a locking member, which will be later described in detail, is slid into a space marked C between lock chips 44, The space C is actually a space under the slit 45 next to the right side of the slit B. When taking out a CD in the slit 45 marked A, the lock member engages a space between the lock chip 44 and the auxiliary lock chip 44a. Hence, although the lock chips 44 cannot be formed in the recess 43, it suffices to form one auxiliary lock chip 44a to be able to lock the rack 40A at the position adjacent the recess 43.

In the region of the recess 43, there is also formed the encoder 170.

Figure 6:
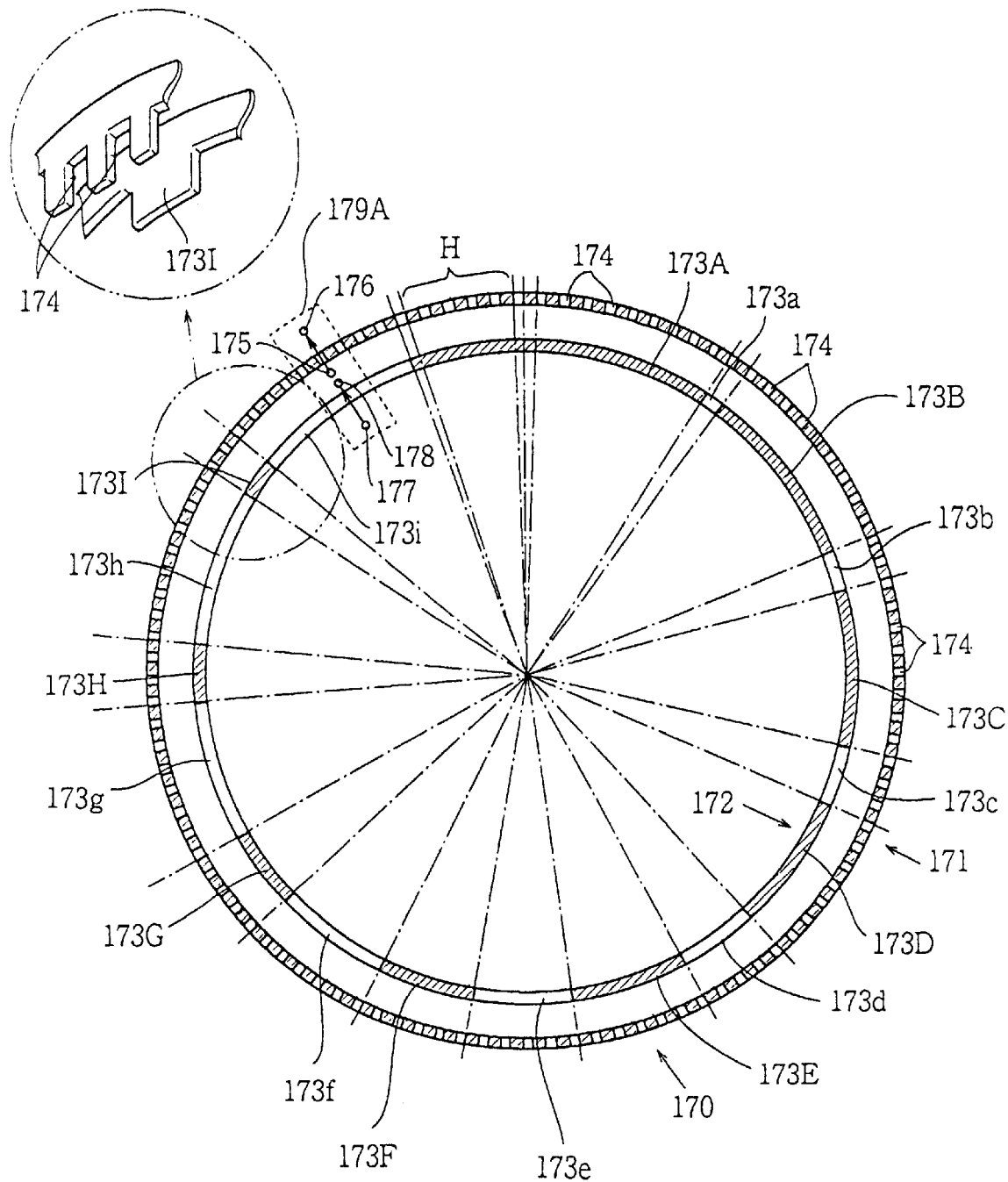
FIG. 6 is a sectional view of an encoder provided on the underside of the rack.

Referring to FIG. 6, the encoder 170 comprises the outer ring 171 and the inner ring 172. Equiangularly formed slits 174 are formed along the entire circumference of the outer ring 171, each slit 174 corresponding to the position of the slit 45. Namely, the slits 174 are provided even at the home position H corresponding to the area of the recess 43. The inner ring 172 has the light blocking projections 173A to 173I, the widths of which are adapted to decrease in the clockwise direction, starting from the home position H. To the contrary, the widths of the slits 173a to 173i between the respective projections 173A to 173I are increased.

An optical sensor 179A for detecting the angular position of the rack 40A is provided on the base 31 at a position opposite the disc player 70 as shown in FIG. 2.

Referring back to FIG. 6, the optical sensor 179A comprises a set of light emitting element 175 and Light receiving element 176 for detecting the slits 174 of the outer ring 171, and another set of light emitting element 177 and light receiving element 178 for detecting the slits 173a to 173i of the inner ring 172. The light receiving element 176 receives the light emitted from the light emitting element 175 whenever the light slit 45 passes between the two elements 175 and 176, thereby producing a signal. Similarly, the light receiving element 178 generates a signal when any of the slits 173a to 173i passes the elements 177 and 178 so that the light from the light emitting element 177 reaches the light receiving element 178 without being blocked by the projections 173A to 173I. The position of the rack 40A, that is the slit 45 facing the disc player 70 and the slits 45 facing opening 111 of the operation panel 110 can be determined in accordance with the combination of the pulses generated by the light receiving elements 176 and 178. Since the slits 174 are also formed in the home position H, the position of the slits 45 can be determined even when the sensor 179A is at the home position.

The other racks 40B to 40E have the same construction as the rack 40A except for the encoder 170. Since all of the racks 40A to 40E rotate simultaneously, the encoder 170 on the rack 40A is sufficient to determine the angular position of all racks.

FIG. 7 shows the disc player 70 and a device for loading a disc onto the player 70 provided therein. The disc player 70 has a body 71 from which the arm 72 pivotally mounted on a pivot 72a is horizontally projected. An arm 73 pivotally mounted on a pivot 73a is vertically provided in the body 71.

When loading the CD 200 or 201 in the disc player 70, the arm 73 is rotated in the clockwise direction until it abuts on the periphery of the CD. The diameters of the CDs 200 and 201 differ so that the rotating angle of the arm 73 depends on whether the disc is the twelve-centimeter CD 200 or the eight-centimeter CD 201. Hence the size of the CD can be determined by detecting the rotating angle of the arm 73. The operations of the arms 72 and 73 thereafter are hence determined so as to comply with the size of the CD.

The arm 72 is then rotated in the counterclockwise direction and enters the rack 40A, for example, from the underside thereof through one of the slits 45. The arm 72 abuts against the lower periphery of the CD 200 or 201 held in the slit 45. The CD 200 or 201 is accordingly securely grasped by the arms 72 and 73 which are then rotated in the counterclockwise direction. The CD is thus carried into the body 71 and cramped on a turntable (not shown) disposed therein. The arm 72 and 73 are slightly rotated in the opposite directions so as to release the CD, thereby enabling to rotate the CD for reproduction. When ejecting the CD from the disc player 70, the arms 72 and 73 are operated in the reverse manner so that the CD returns to the slit 45 of the rack 40A.

The disc player 70 is further provided with a rack lock device 160 disposed integral with the body 71 at a bottom portion thereof. The rack lock device 160 locks the rotation of the racks 40A to 40E in cooperation with the lock chips 44 and 44a (FIG. 3) formed on the undersides of the racks during the loading and ejecting of the CD.

Figure 8:
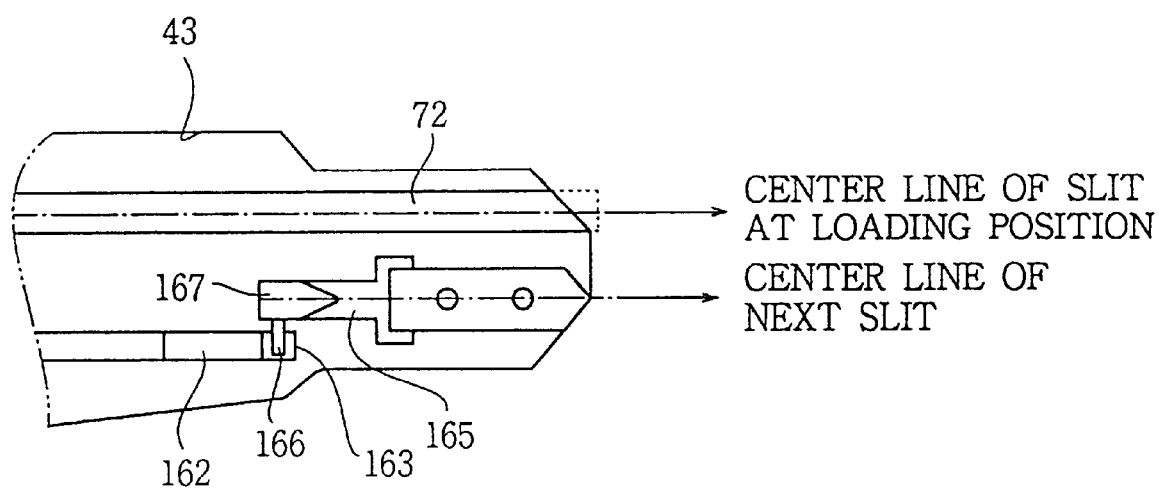
FIG. 8 is a fragmentary plan view showing a lock device mounted on the disc player.
Figure 9:
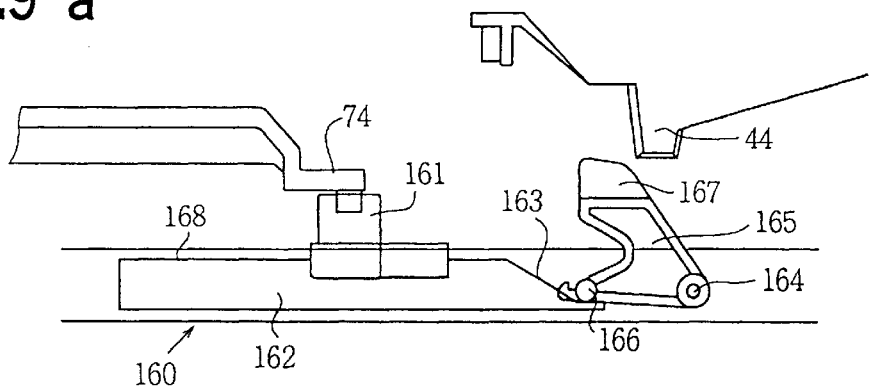
FIGS. 9a to 9d are illustrations explaining the operation of the lock device.
Figure 9:
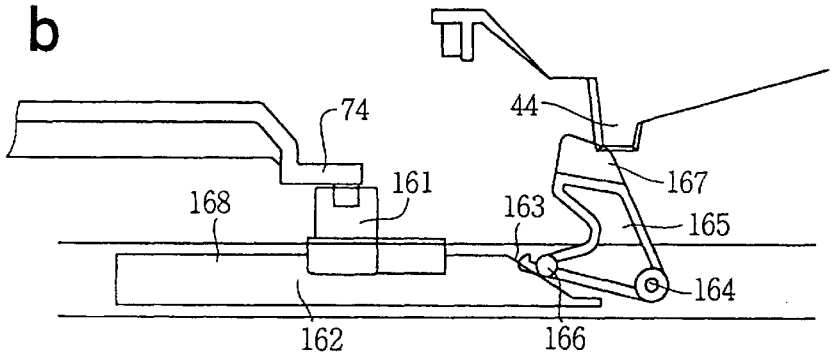
Figure 9:
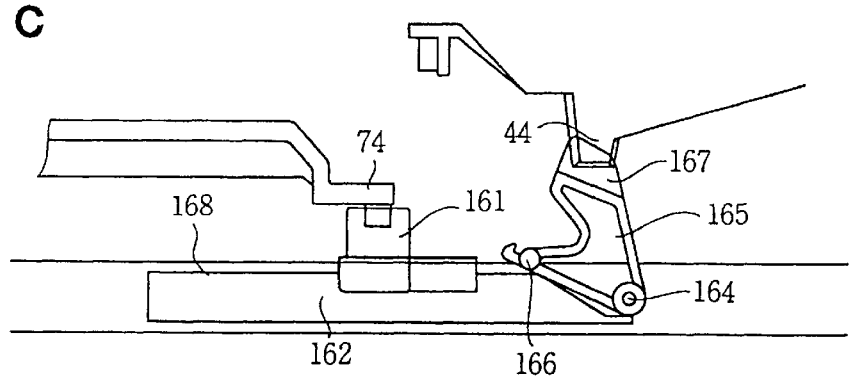
Figure 9:
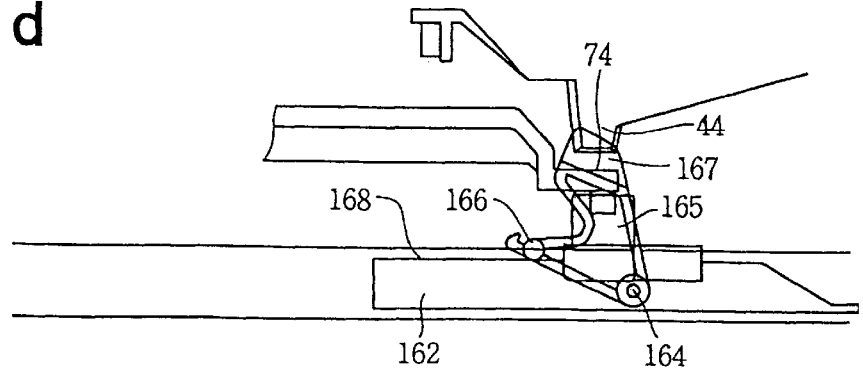

Referring to FIGS. 8 and 9a, the rack lock device 160 has a drive plate 74 attached to the body 71 and movable by a driving means (not shown), and a retractable slider 162 securely attached through a support 161 to the drive plate 74. The slider 162 has an upper surface 168, the front portion thereof adjacent the rack 40A cut away to form a cam 163. A lock arm 165 is pivotally mounted on a pivot 164, disposed adjacent the cam 163. The lock arm 165 has an engaging pin 166 which engages with the slider 162 and a lock projection 167 which is adapted to enter the space between the adjacent lock chips 44 and the space between chips 44 and 44a.

More particularly, the lock device 160, when not in motion, is positioned as shown in FIG. 9a so that the engaging pin 166 is at the bottom of the cam 163. When the rack 40A, for example, is rotated and positioned where the slit 45 storing a desired CD 200 or 201 is at the loading position, the slider 162 is moved toward the rack 40A. The pin 166 accordingly starts to climb up the cam 163 thereby rotating the lock arm 165 about the pivot 164 as shown in FIG. 9b. When the engaging pin 166 is at the top of the cam 163, the lock projection 167 is inserted in the space between the lock chips 44 as shown FIG. 9c.

As the slider 162 further advances, the engaging pin 166 is positioned on the upper surface 168 of the slider 162. Hence the rotation of the arm 165 is stopped. The engaging pin 166 instead slides on the upper surface 168 so that the lock projection 167 is firmly held between the lock chips 44. The rotation of the rack 40A is hence locked.

Namely, as shown in FIG. 8, when the center line of the arm 72 of the disc player 70 is positioned to coincide with that of the slit 45 storing the desired CD, the center line of the lock projection 167 of the lock arm 165 coincides with that of the slit next to the above described slit 45 in the counterclockwise direction.

The operation of the disc reproducing system according to the present invention will now be described.

When opening the door 60 of the operation panel 110, an open button (not shown) provided on the panel 110 is operated. The door driving system 120 is accordingly operated to rotate the door 60 in the counterclockwise direction. When the door 60 is completely opened, the opening detecting switch 131 is turned on.

The operator can now store the CDs 200 or 201 in the empty slits 45 of the racks 40A to 40E facing the opening 111, or exchange the CDs already in the slits with other CDs.

When another button on the panel 110 is operated, the rack driving system 140 is driven, thereby simultaneously rotating the racks 40A to 40E. Hence, the slits 45 storing the CDs 200 and 201 which are to be exchanged can be positioned adjacent the opening 111. Although the racks 40A to 40E are located where the optical sensor 179A is positioned at the home position H of the encoder 170, since the slits 174 are formed on the outer ring, it is possible to determine the angular position of the racks. Hence the racks can be accurately positioned, and the desired slits 45 face the opening 111.

When the CDs 200 and 201 are stored or exchanged, a close button (not shown) on the operation panel 110 is operated. The door driving system 120 is then operated, thereby closing the door 60. The closing detecting switch 130 is turned on when the door 60 is completely closed.

A CD select button (not shown) provided on the operation panel 110 is operated. Namely, the slit 45 storing the desired CD and the rack thereof is selected. Thereafter, the rack driving system 140 is driven, thereby simultaneously rotating the racks 40A to 40E in the clockwise or counterclockwise direction. The rotation is stopped when the optical sensor 179A detects in accordance with the signal pulses caused by the encoder 170 that the recess 43 of each of the racks 40A to 40E is at the position directly in front of the disc player 70.

Figure 10:
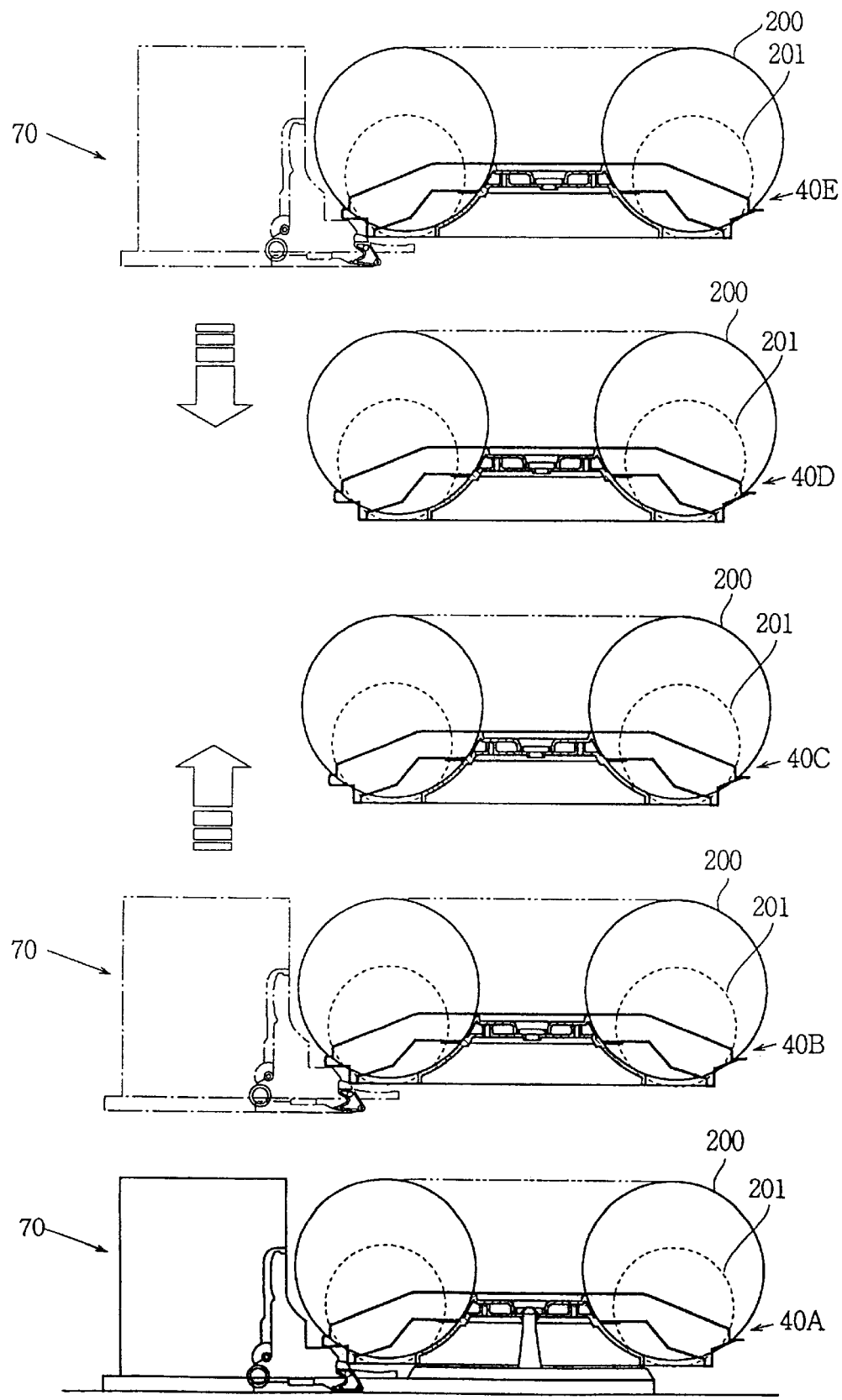
FIG. 10 is an illustration explaining the vertical movement of the disc player.

The disc player 70 is then vertically moved through the recesses 43 by a driving means (not shown) without the arm 72 thereof getting caught by the racks 40A to 40E as shown in FIG. 10. The disc player 70 therefore reaches the rack which holds the selected CD.

The racks 40A to 40E are then again simultaneously rotated until the optical sensor 179A detects that the slit 45 storing the desired CD is at the loading position located directly in front of the disc player 70.

When the rotation of the racks is stopped, the slider 162 of the rack lock device 160 is projected toward the selected rack as shown in FIG. 9b. The lock projection 167 of the lock arm 165 is inserted in the space between the lock chips 44 disposed interposing the slit 45 which is the next slit to the slit 45 storing the desired CD as shown in FIGS. 9c and 9d. Thus the racks 40A to 40E are all locked, preventing the rotation thereof. In addition, the selected rack is securely connected to the disc player 70.

As shown in FIGS. 3 and 4, when the desired CD is stored in the slit 45 marked A adjacent the recess 43, the lock projection 167 is inserted in the space between the lock chip 44 formed adjacent the slit A and the auxiliary lock chip 44a.

When the selected rack is thus connected to the disc player 70, the arm 73 vertically disposed in the body 71 of the disc player 70 is rotated in the clockwise direction until the arm 73 abuts on the periphery of the selected CD 200 or 201. The arm 72 is rotated in the counterclockwise direction entering the slit 45, thereby abutting on the lower periphery of the CD. The arms 72 and 73, holding the CD therebetween, are rotated in the counterclockwise direction to carry the CD into the body 71. The CD is thereafter clamped on the turntable of the disc player so as to be reproduced. Before playing the CD, the arms 72 and 73 are slightly rotated to be released from the CD.

When ejecting out the CD, the arms 72 and 73 again grasp the CD and are rotated in the opposite direction as before. Hence the CD is returned to the slit 45 thereof.

The slider 162 is thereafter retracted to the disc player 70 so that the engagement of the lock projection 167 with the lock chips 44 is released. The racks 40A to 40E can be rotated, and the disc reproducing system 10 awaits for the instruction to play the next CD 200 or 201.

Figure 11:
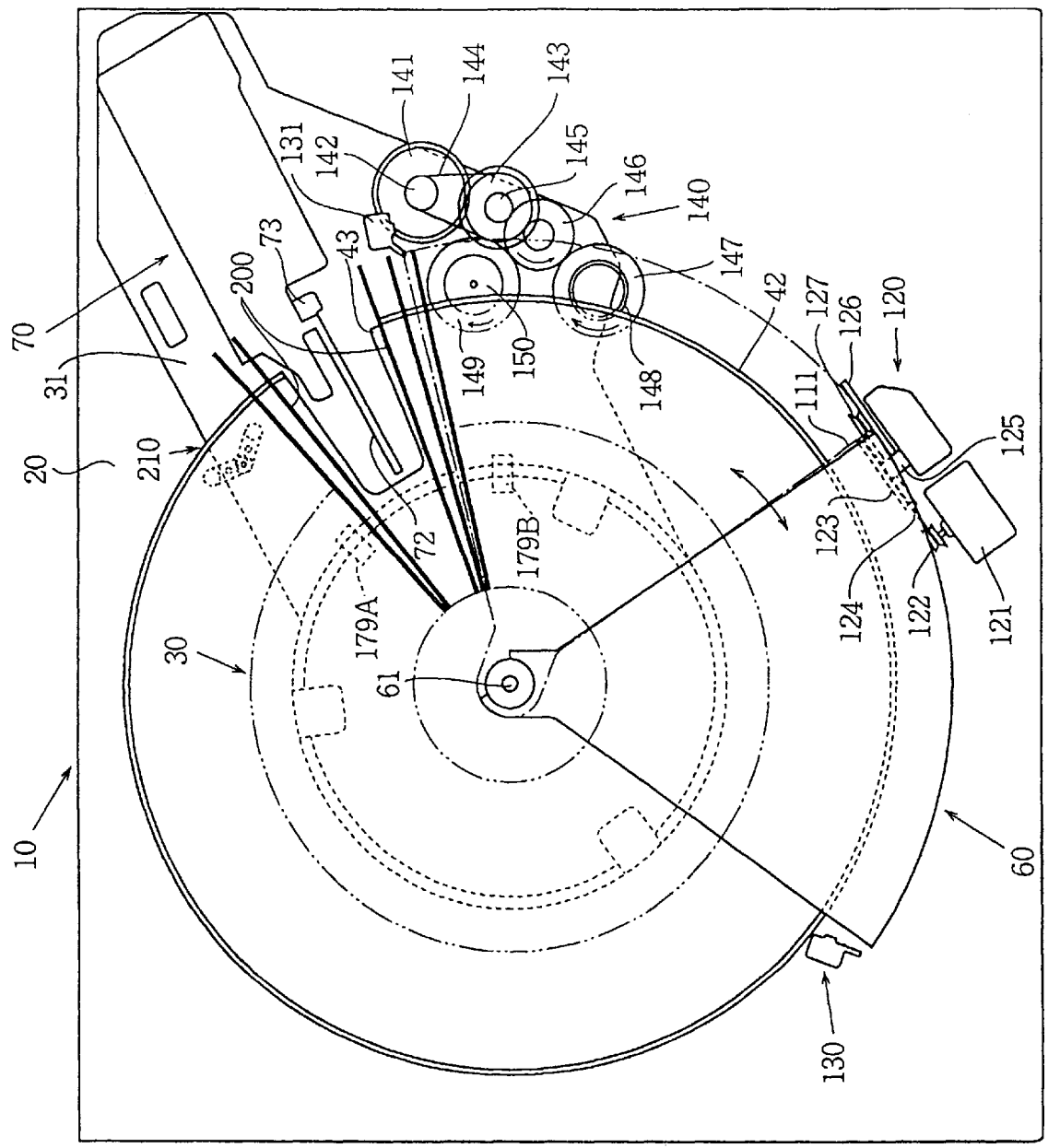
FIG. 11 is a plan view of the disc reproducing system according to the second embodiment of the present invention.
Figure 12:
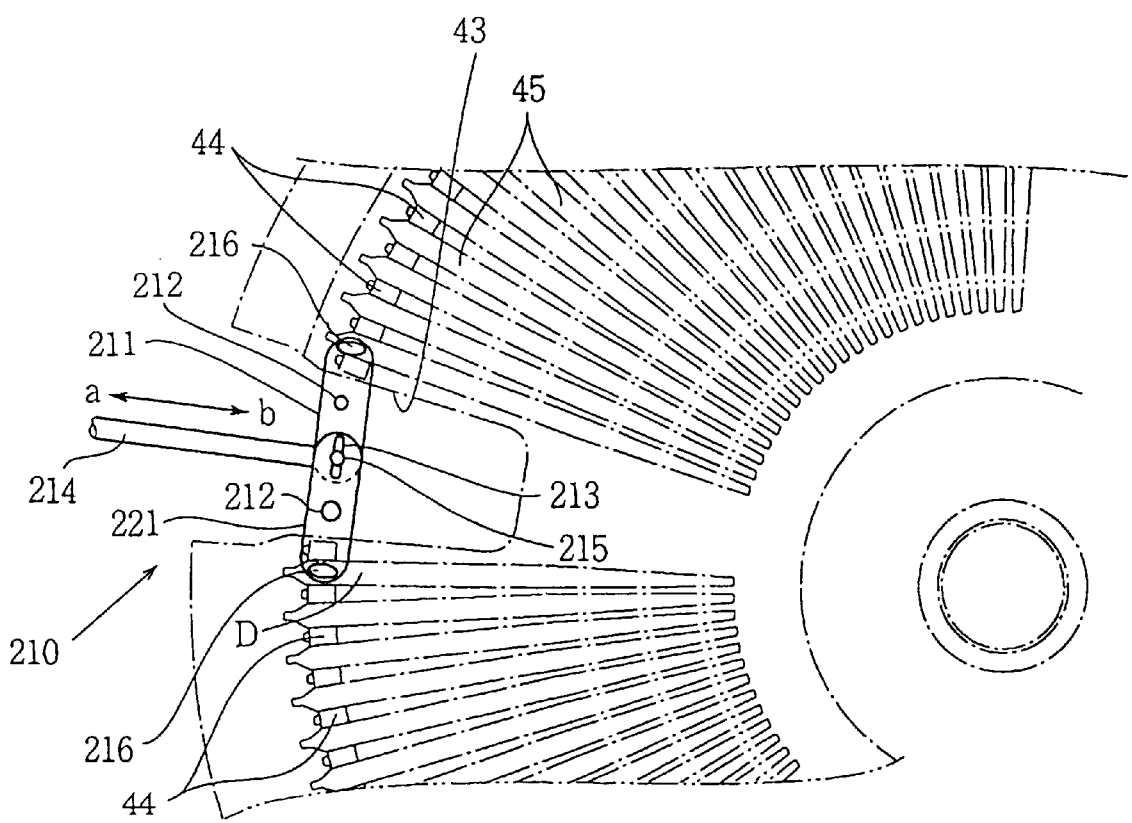
FIG. 12 is a fragmentary plan view of the rack as seen from the underside thereof showing the lock device in the second embodiment.
Figures 13, 13A:
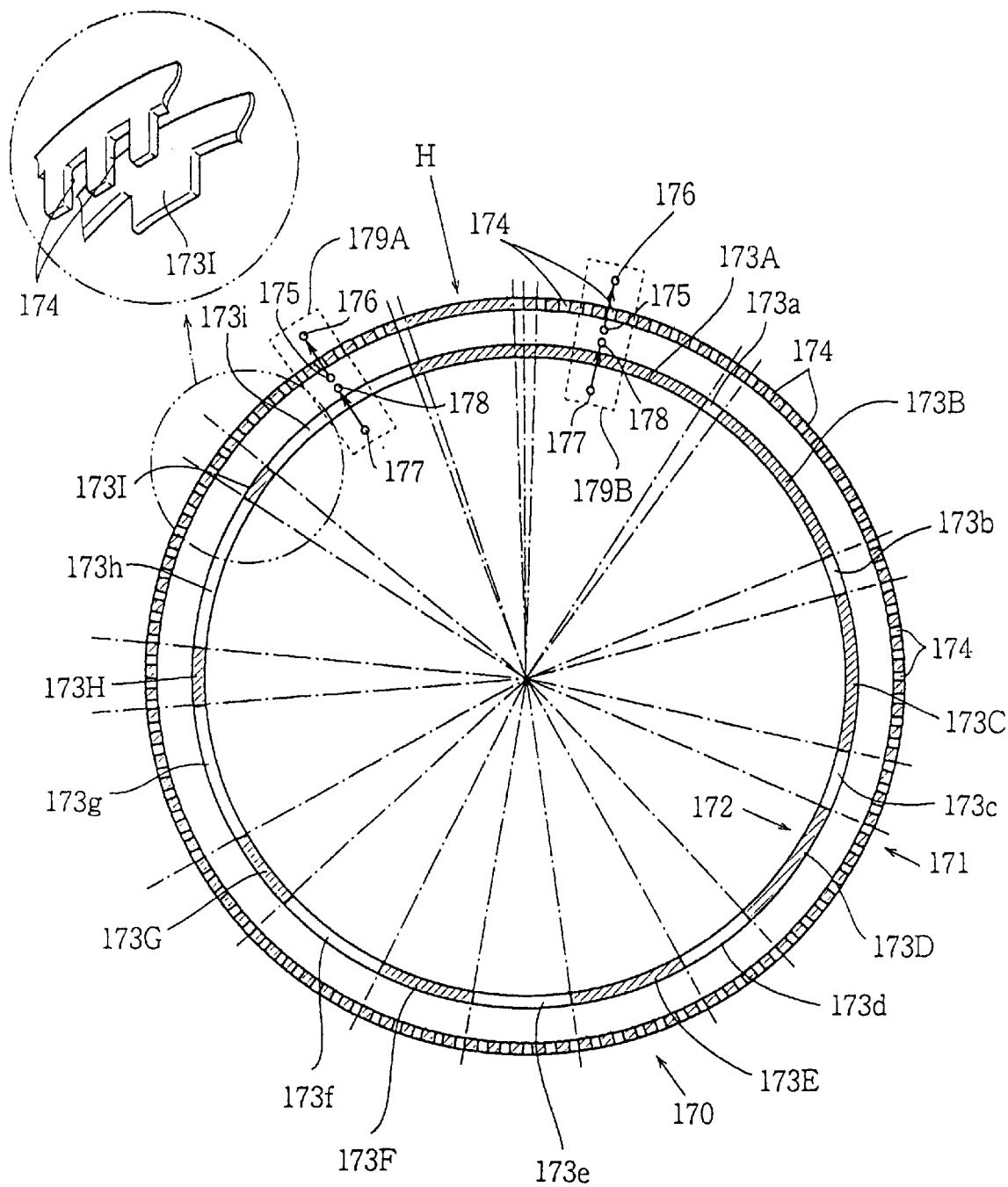
FIG. 13 is a sectional view of the encoder provided on the rack of the second embodiment.

FIGS. 11 to 13 show the second embodiment of the present invention.

As shown in FIGS. 11 and 12, the disc reproducing system 10 has a double rack lock device 210 instead of the rack lock device 160.

Referring to FIG. 12, the double rack lock device 210 comprises a rod 214 which is connected to the drive plate 74 (FIG. 9a) slidably attached to the body 71 of the disc player 70, and a pair of lock arms 211 and 221 attached to the front end of the rod 214. Each of the lock arms 211 and 221 is rotatable about a pivot 212, and has an elongated hole 213 at an inner end portion thereof. The lock arms 211 and 221 are overlapped so that the elongated holes 213 coincide with each other, and a pin 215 attached to the rod 214 is inserted in the holes 213, thereby pivotally linking the lock arms 211 and 221 together by sliding the rod 214. At the other end portion of each of the lock arms 211 and 221, there is provided a lock projection 216 which is adapted to be inserted in the space between the lock chips 44 of the racks 40A to 40E.

When the rod 214 is retracted toward the disc player 70 in a direction a, the lock arm 211 is rotated in the clockwise direction about the pivot 212 and the lock arm 221 is rotated in the counterclockwise direction about the pivot 212. The lock projections 216 of the lock arms 211 and 221 are engaged with the lock chips 44 of the rack, while the slit 45 of the selected CD is positioned between the lock projections 216. Hence the rotation of the racks 40A to 40E is locked.

The distance between the lock projections 216 of the lock arms 211 and 221 is so set that the linked arms 211 and 221 cross over the recess 43.

When loading the CD stored in the slit 45 marked D in FIG. 12, which is the slit adjacent the recess 43, the lock projection 216 of the lock arm 211 is positioned under the recess 43 where there is no lock chip 44 with which the projection 216 can engage. However, the projection 216 of the other lock arm 221 is positioned where there are formed the lock chips 44 so that the racks 40A to 40E can be locked.

The rack lock device 210 of the present embodiment may be modified so that the lock arms 211 and 221, and the rod 214 are integral with one another.

As shown in FIG. 11, in the second embodiment, there is provided a second optical sensor 179B in addition to the optical sensor 179A. The distance between the optical sensors 179A and 179B is set to be larger than the width of the recess 43.

Referring to FIG. 13, if two optical sensors 179A and 179B are thus provided, the slits 174 of the outer ring 171 can be obviated at the home position H. More particularly, when one of the sensors 179A and 179B is at the home position H, since there are no slits 174 in the home position, the sensor cannot detect the position of the rack 40A. However, the other sensor is inevitably in the area outside the home position H, thereby enabling to detect the slit 45. Thus the angular position of the rack 40A can be determined without fail.

Figures 14, 14A:
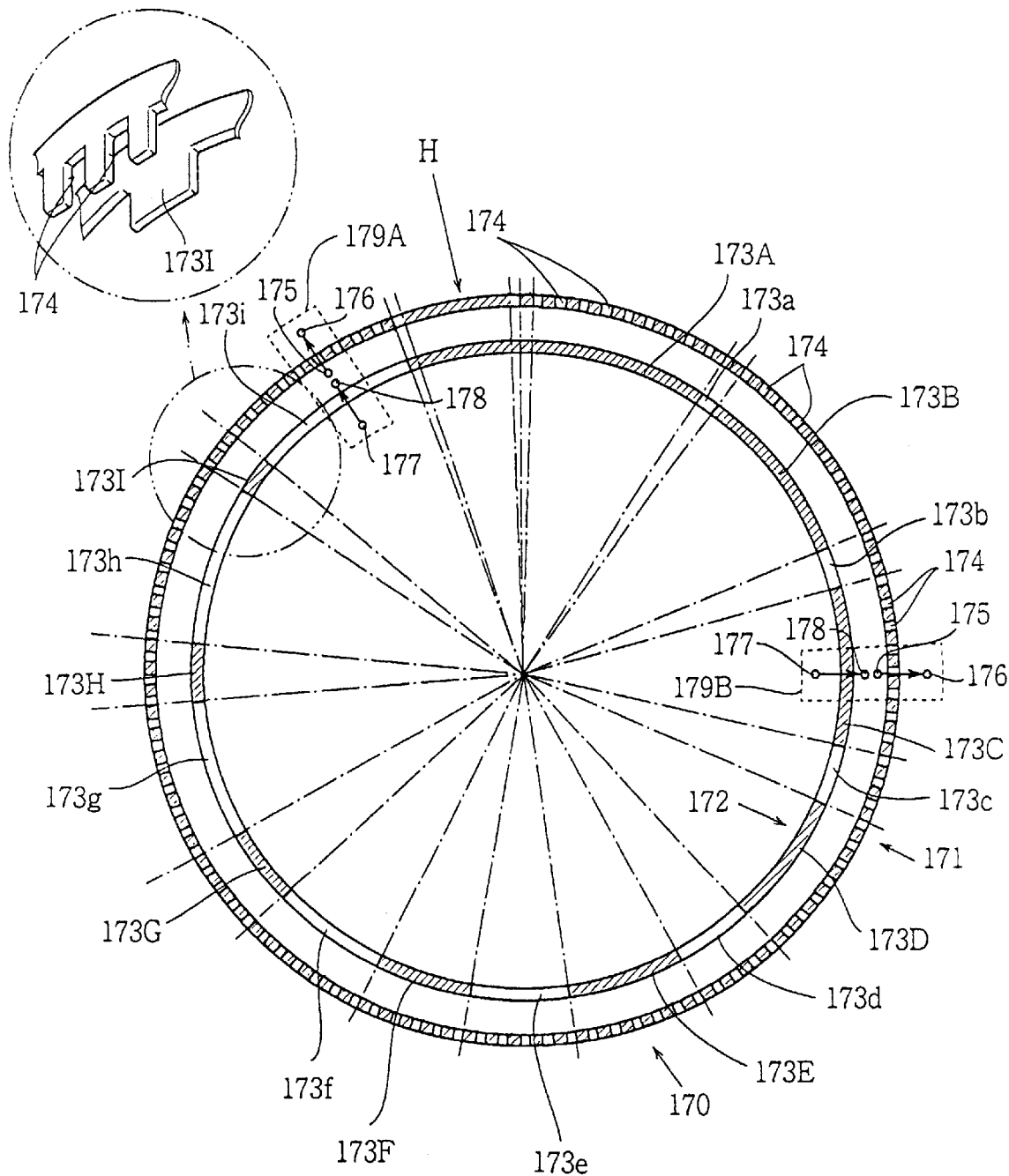
FIG. 14 is a sectional view of the encoder provided in a modification of the second embodiment.
Figure 15:
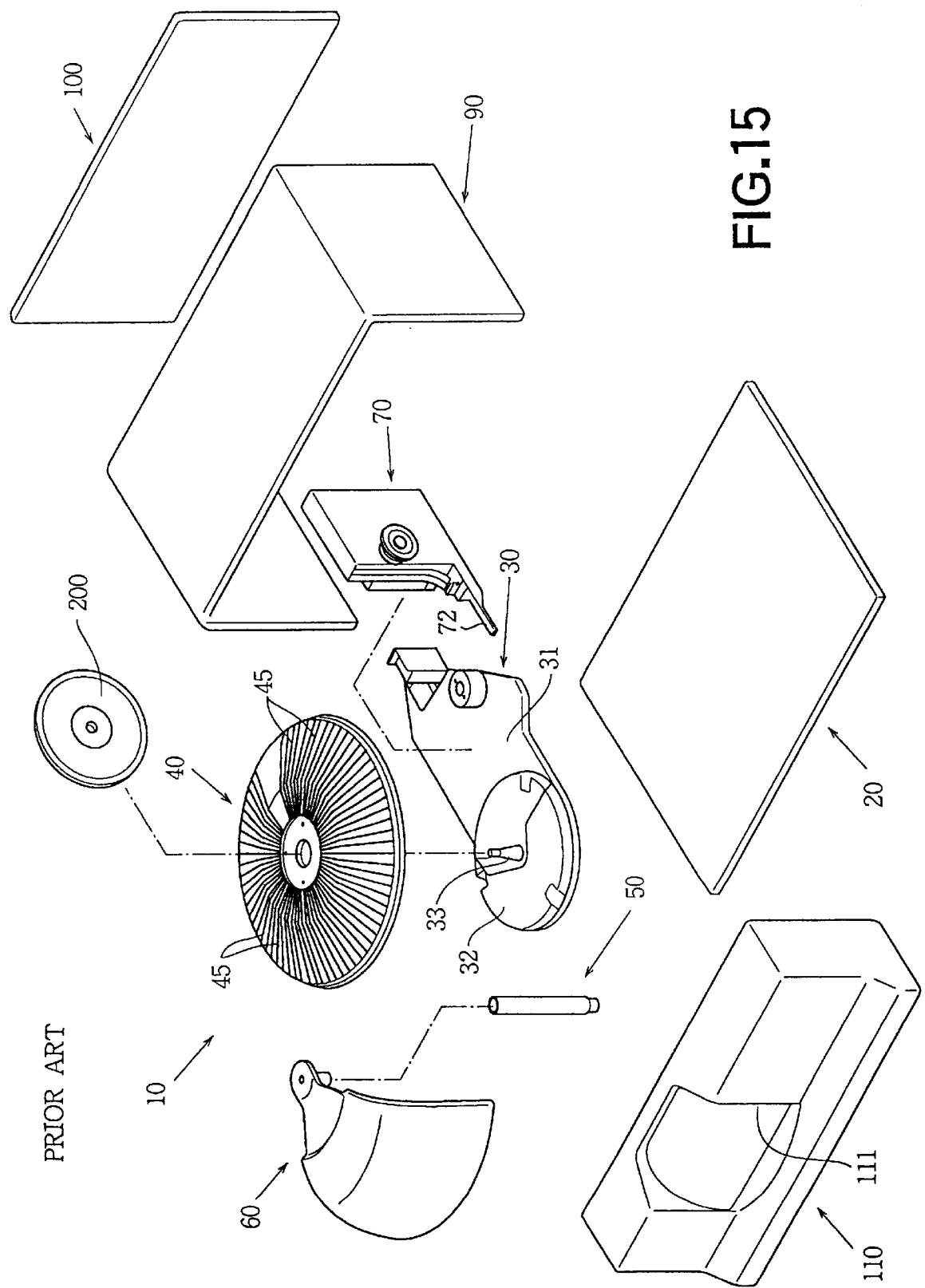
FIG. 15 is an exploded perspective view of a conventional disc reproducing system.

The present embodiment may further be modified so that the optical sensor 179A is disposed at a position facing the disc player 70 while the other optical sensor 179B is disposed at a position facing the opening 11 of the operation panel 110 as shown in FIG. 14. Thus, the optical sensor 179A exclusively detects the slit 45 at the loading position and the optical sensor 179B exclusively detects the slit 45 at the disc exchanging position, thereby simplifying the operation of the sensors and improving the accuracy of the detection.

The present invention may be applied to a disc reproducing system where the racks are disposed laterally instead of vertically as hereinbefore described. The present invention may further be applied to systems where other mediums, such as video discs and cassettes stored therein are reproduced.

In accordance with the present invention, the angular position of the racks storing the recording mediums can always be accurately detected despite the simple construction of the system.

The lock device for engaging with the lock chips of the racks so as to lock the rotation of the racks is provided in the disc player which is adapted to move through the recesses formed in each rack. Hence only one lock device is necessary to lock the movement of all racks, thereby greatly decreasing the number of parts. The lock device can securely lock the racks even when facing the recess where there are no lock chips.

While the invention has been described in conjunction with preferred specific embodiment thereof, it will be understood that this description is intended to illustrate and not limit the scope of the invention, which is defined by the following claims.

What is claimed is:

1. A system for storing a plurality of discs in a reproducing system comprising:

a rotary circular rack, the rack having a plurality of radial slits, each for storing a disc, and having a non-storing portion without the slits such that discs can not be stored in the non-storing portion, a disc player provided for reproducing a disc removed from one of the slits;

a rotating device for rotating the circular rack;

detected portions circumferentially and equiangularly formed around the entire rack including at the non-storing portion;

detector means for detecting an angular position of each of the detected portions, whereby an angular position of the rack is determined in order to reproduce a selected disc stored in the rack.

2. The system according to claim 1 further comprising:

a locked portion provided in each of the slits, a lock means provided to be engaged with the locked portion of a slit adjacent to the slit storing a selected disc.

3. The system according to claim 1 further comprising:

a locked portion provided in each of the slits, a lock means comprising a first means to be engaged with the locked portion, and a second means for locking the first means.

4. The system according to claim 1, wherein the detector means comprises a first detector means and a second detector means, the circumferential distance between the first detector means and the second detector means is set to be larger than the circumferential width of the non-storing portion.

5. A system for storing a plurality of discs in a reproducing system comprising:

a plurality of rotary circular racks vertically disposed, each of the racks having a plurality of radial slits, each for storing a disc, and having a radially formed recess without the slits, the recesses of all racks being located at the same circumferential position;

a loading mechanism provided to be vertically moved passing through the recess for reproducing a disc removed from one of the slits;

the loading mechanism having a disc player and lock means provided for engaging with one of the slits so as to lock the racks at a position dependent on the lock means;

a rotating device for rotating the circular racks at the same time;

detected portions circumferentially provided on each of the racks at a radially inner position with respect to the recess;

detector means for detecting an angular position of each of the detected portions, whereby an angular position of all of the racks is determined in order to reproduce a selected disc stored in one of the racks.

* * * * *